United States Patent
Oliver et al.

(10) Patent No.: US 9,494,269 B2
(45) Date of Patent: Nov. 15, 2016

(54) CONNECTION ELEMENT WITH SEALING MEMBER

(71) Applicant: SALCO PRODUCTS INC., Lemont, IL (US)

(72) Inventors: John R. Oliver, Chicago, IL (US); David A. Oestermeyer, Downers Grove, IL (US); William R. Borowski, Lemont, IL (US); Hussain Maalem, Crest Hill, IL (US); Larry McMullin, Elwood, IL (US)

(73) Assignee: SALCO PRODUCTS INC., Lemont, IL (US)

( * ) Notice: Subject to any disclaimer, the term of this patent is extended or adjusted under 35 U.S.C. 154(b) by 0 days.

(21) Appl. No.: 14/608,978

(22) Filed: Jan. 29, 2015

(65) Prior Publication Data

US 2015/0211671 A1    Jul. 30, 2015

Related U.S. Application Data

(60) Provisional application No. 61/933,597, filed on Jan. 30, 2014.

(51) Int. Cl.
*F16L 55/10* (2006.01)
*F16L 55/115* (2006.01)

(52) U.S. Cl.
CPC ................................. *F16L 55/1157* (2013.01)

(58) Field of Classification Search
CPC ... F16L 55/1157; F16L 55/115; F16L 57/005
USPC ............. 138/89, 96 T, 96 R; 220/234, 212.5; 215/355, 296, 298, 305
See application file for complete search history.

(56) References Cited

U.S. PATENT DOCUMENTS

| | | | |
|---|---|---|---|
| 3,302,664 A * | 2/1967 | Plamann | F24C 5/16 138/89 |
| 3,439,942 A | 4/1969 | Moore et al. | |
| 3,672,403 A * | 6/1972 | Wilson | F16L 55/1157 138/89 |
| 3,722,549 A * | 3/1973 | Wilson | F16L 55/1157 138/89 |
| 4,014,367 A * | 3/1977 | Milo | F16L 55/115 138/89 |
| 4,351,446 A * | 9/1982 | Madden | F16L 55/1157 138/89 |
| 5,038,829 A * | 8/1991 | Panella | F16L 55/115 138/89 |

(Continued)

OTHER PUBLICATIONS

U.S. Appl. No. 14/609,021, filed Jan. 29, 2015.

*Primary Examiner* — Patrick F Brinson
(74) *Attorney, Agent, or Firm* — Leydig, Voit & Meyer, Ltd.

(57) ABSTRACT

A connection assembly for sealing to an end of a tube includes a polymeric body having an opening including an open end and an internal sealing surface spaced from the open end. The opening is configured to slidably receive the end of the tube. A reinforcement member is spaced from and generally surrounds at least a portion of the opening and a sealing member is adjacent the internal sealing surface of the opening. The sealing member is configured to interact with the internal sealing surface of the opening and the end of the tube to form a seal between the connection assembly and the tube.

20 Claims, 5 Drawing Sheets

(56) References Cited

U.S. PATENT DOCUMENTS

| | | |
|---|---|---|
| 5,295,717 A | 3/1994 | Chen et al. |
| 5,435,604 A | 7/1995 | Chen et al. |
| 5,437,309 A * | 8/1995 | Timmons .............. F16L 57/005 138/89 |
| 5,791,694 A | 8/1998 | Fahl et al. |
| 6,508,274 B2 * | 1/2003 | Street ...................... F16L 37/18 138/89 |
| 7,134,454 B2 * | 11/2006 | Montminy .......... F16L 55/1157 138/89 |
| 7,644,734 B2 * | 1/2010 | Palmer ................ F16L 55/1157 138/89 |
| 8,397,764 B2 * | 3/2013 | Palmer .................. F16L 57/005 138/89 |

* cited by examiner

CONNECTION ELEMENT WITH SEALING MEMBER

CROSS REFERENCE TO RELATED APPLICATION

This application claims priority pursuant to Title 35 U.S.C. §119(e) to U.S. Provisional Application No. 61/933,597 filed Jan. 30, 2014, entitled "Corrosion Resistant Cover," the contents of which are hereby incorporated by reference herein as if fully set forth.

TECHNICAL FIELD

This disclosure relates to non-corrosive covers or caps for use with fluid lines and, more particularly, to covers or caps that are removably mounted such as those that include a quick connect "earn and groove" locking connection.

Liquids used in chemical processing may, in some instances, be extremely corrosive to metal. Metal storage and transport containers must, therefore, be lined with a protective coating, such as rubber to provide reasonable durability to the equipment used in the storage and transportation functions.

One important aspect of liquid storage or transport is the releasable connection of supply or discharge lines to a containment vessel for delivery or removal of the contained liquid. One connection system component widely employed is the "cam and groove" connector coupling. The connector components are easily joined to provide a releasable leak proof relationship between a containment vessel and an attached flexible line or hose.

The coupling includes a tubular adapter or male end, which is usually a part of a containment vessel, and a slidably attachable coupler, which is usually a part of the fluid line. When the coupler is not attached, a cap or cover having a similar cam and lever configuration is employed to protect the tubular adapter, and prevent dirt and debris from entering the tubular adapter. The cover also seals the adapter end, and thus the containment vessel, in case a valve utilized to regulate flow out of the containment vessel is inadvertently opened without a fluid line connected to the tubular adapter.

In some applications, the tubular adapter includes a circular concave groove or recess spaced from its open end. A cover to be mounted thereon includes a pair of diametrically opposed pivotal cam levers that are pivotal between locked and unlocked positions. At the locked position, a retention cam of each cam lever engages the groove of the tubular adapter to releasably secure the cover to the tubular adapter. When use of the connected line is desired, the cam levers are pivoted to move the cams to the unlocked position to permit the cover to be slidably removed from the tubular adapter.

Covers made of metal are subject to corrosion when the containment vessel is filled with corrosive materials. Corrosion resistant covers have been made from materials such as polypropylene but such covers are prone to cracking or breaking if dropped from any significant height (e.g., four feet). Other polymeric materials such as Ultra High Molecular Weight Polyethylene (UHMWPE) have become a useful material in the storage and transport of corrosive liquids. UHMWPE, however, is relatively soft, and subject to deformation under load. Accordingly, while it is desirable to have a cover made from such material, it has also been impractical.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY OF THE DISCLOSURE

The present disclosure is directed to a cover made of non-corrosive polymeric material, such as UHMWPE. The cover is sufficiently durable to withstand repeated opening and closing cycles and has improved impact resistance to reduce the likelihood of breakage if dropped.

In one aspect, a closure for sealing an end of a tube includes a polymeric body having a cavity in which the cavity has an open end and a closed end. The closed end has an internal sealing surface and the cavity is configured to slidably receive the end of the tube. A reinforcement member is spaced from and generally surrounds at least a portion of the cavity and a sealing member is generally adjacent the internal sealing surface of the closed end. The sealing member is configured to interact with the internal sealing surface and the end of the tube to seal the tube.

In another aspect, a method of forming a closure for sealing an end of a tube includes providing a first polymeric body component, providing a second polymeric body component, and positioning a reinforcement member adjacent one of the first body component and the second body component. The method further includes securing the first body component to the second body component to form a body and capture the reinforcement member at least partially between the first body component and the second body component. The body includes a cavity having an open end and a closed end with the closed end having an internal sealing surface, the cavity is configured to slidably receive the end of the tube, and the reinforcement member is spaced from the cavity. The method also includes mounting a sealing member generally adjacent the internal sealing surface.

In still another aspect, a connection assembly for sealing to an end of a tube includes a polymeric body having an opening including an open end and an internal sealing surface spaced from the open end. The opening is configured to slidably receive the end of the tube. A reinforcement member is spaced from and generally surrounds at least a portion of the opening and a sealing member is adjacent the internal sealing surface of the opening. The sealing member is configured to interact with the internal sealing surface of the opening and the end of the tube to form a seal between the connection assembly and the tube.

DETAILED DESCRIPTION OF THE ILLUSTRATED EMBODIMENT

Figure 1:
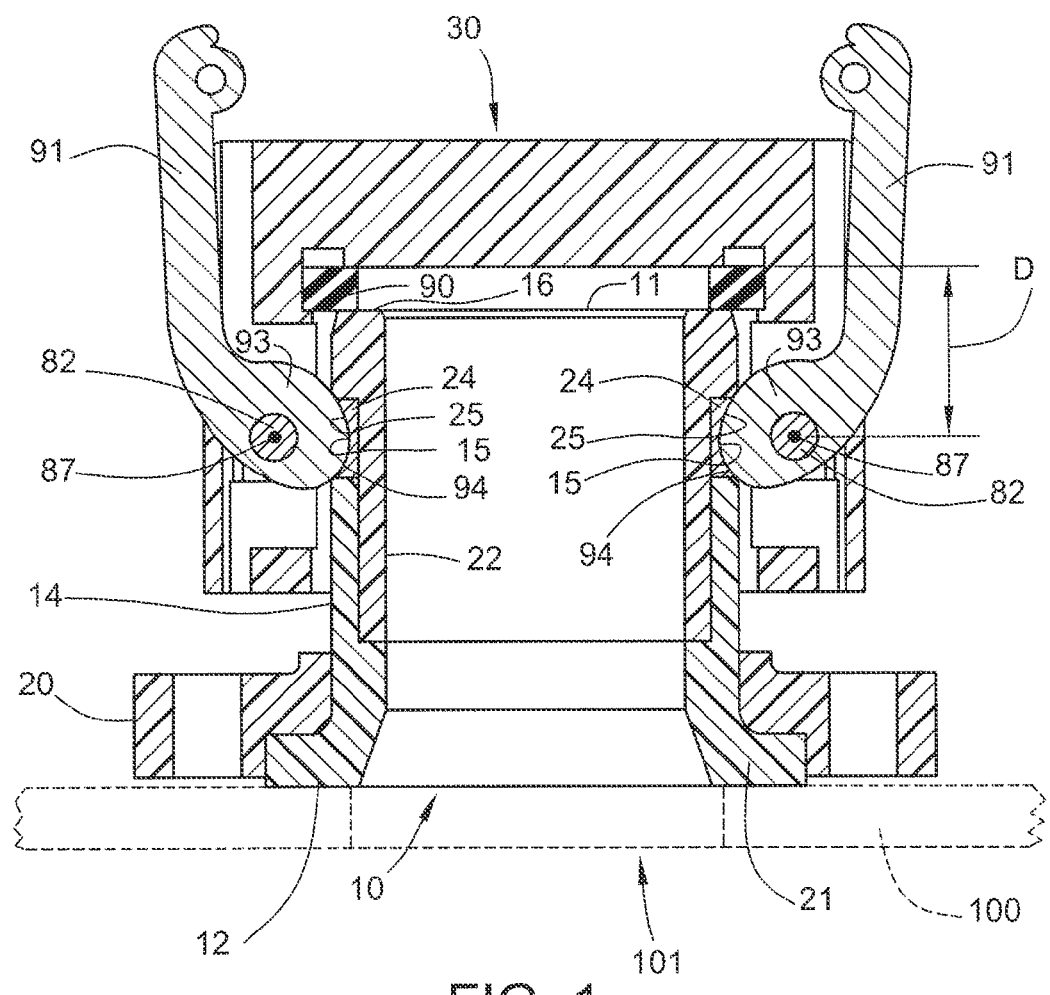
FIG. 1 is a cross-sectional view of a tubular adapter with a cover in accordance with the principles of the present disclosure mounted thereon.
Figure 2:
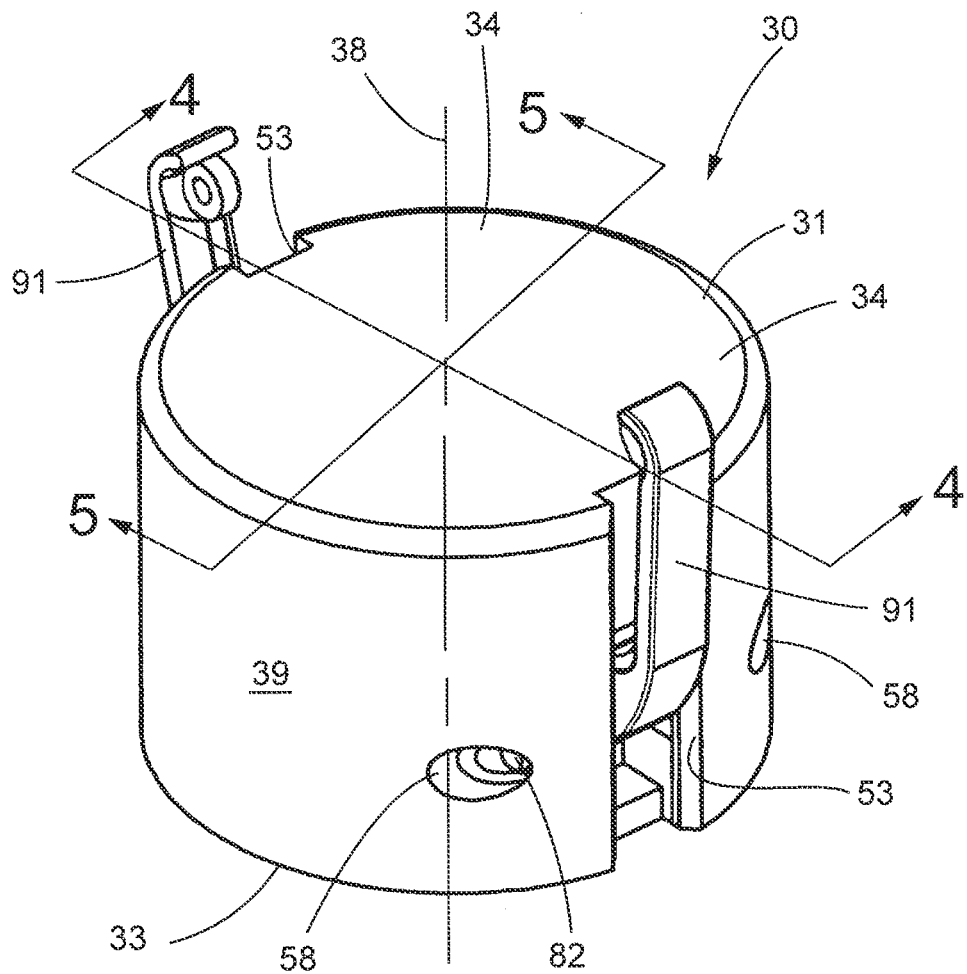
FIG. 2 is a perspective view of the cover of FIG. 1.

Referring to FIG. 1, an adapter or male end generally designated 10 together with a closure in the form of a cover or cap generally designated 30 mounted thereon are illustrated. Adapter 10 is a hollow tubular element with an open end 11. The opposite end 12 is configured to be secured to a containment vessel 100 in fluid tight relation. Adapter 10 defines internal flow passage 13 which provides an ingress and egress to port 101 of vessel 100.

Adapter 10 defines an outer cylindrical pilot 14 configured to releasably receive cap 30 in slidable telescoping relation onto pilot 14. Outer cylindrical pilot 14 includes an external, annular axially extending concave groove 15 utilized in the connection of the cap 30 to the adapter 10, as will be understood. In one embodiment, the components of adapter 10 may be made from a strong, polymeric material that is resistant to corrosive liquids such as ultra high molecular weight polyethylene ("UHMWPE").

As depicted, adapter 10 may be formed of a series of separate components such as a flange 20, a base 21, and a tubular retention sleeve 22 that are each formed of UHMWPE. Each of the flange 20, base 21, and tubular retention sleeve 22 may be secured together such as by friction or spin welding.

An annular collar 24 made of a continuous metal ring such as stainless steel is positioned on an outer surface of the tubular retention sleeve 22 and is captured between the tubular retention sleeve and the base 21. The outer axial surface 25 of collar 24 includes an axially concave facing radially outward surface that defines the concave groove 15.

Although cap 30 is depicted as being mounted to adapter 10 in FIG. 1, the cap may be mounted to components other than the adapter such as the end of a line, a tube, or a hose or any other component for which sealing is desired. Still further, while adapter 10 is depicted as being formed of UHMWPE, the adapter 10 and any other components to which the cap 30 may be mounted may be formed of other materials as desired.

Cap 30 includes a hollow cylindrical body 31 that has an open end 33 and a closed end 34. Body 31 has an internal cylindrical bore or cavity 35 with an inner generally cylindrical surface 36 that extends from open end 33 and terminates at internal end or sealing surface 37 which seals the internal cavity. Internal cavity 35 is sized to slide onto open end 11 of the adapter 10 in closely spaced supporting relation to the open end. An annular gasket or sealing member 90 is positioned on the internal end surface 37 and interacts with the end surface 16 of open end 11 of the adapter 10 to create a fluid-tight seal between the adapter and the cap 30. Gasket 90 may be made of any desired resilient material. In one embodiment, gasket 90 may be made of an elastomer such as a synthetic rubber made of ethylene propylene diene monomer ("EPDM").

Cap 30 has a locking structure or member in the form of diametrically opposed lever or locking arms 91 pivotally mounted thereon. Each lever arm 91 includes an asymmetrically shaped retention cam 93 pivotal between a first operative locked position and a second operative unlocked position. In the unlocked position, inner cylindrical surface 36 of cap 30 may be slid onto the open end 11 of adapter 10 in overlying sliding relation to outer cylindrical pilot 14. As illustrated in FIG. 1, when the cap is in the locked position, lever arms 91 are positioned in a locked position at which the outer surfaces 94 of the cams 93 are disposed in annular concave groove 15 to secure the cap 30 to the adapter 10.

A valve (not shown) may be operatively connected to adapter 10 to control the flow of fluid through the internal flow passage 13. In most operations, the valve will only be opened when a coupler (not shown) of a hose (not shown) is connected to the open end 11 of the adapter 10. In some situations, the valve may be opened without a coupler or a cap 30 connected to the free end 11. In still other situations, the valve may be inadvertently opened when cap 30 is positioned on the free end 11. In such case, it is desirable for the cap 30 and the lever arms 91 to be sufficiently strong so as to secure the cap 30 to the adapter 10 and seal the open end 11.

Figure 3:
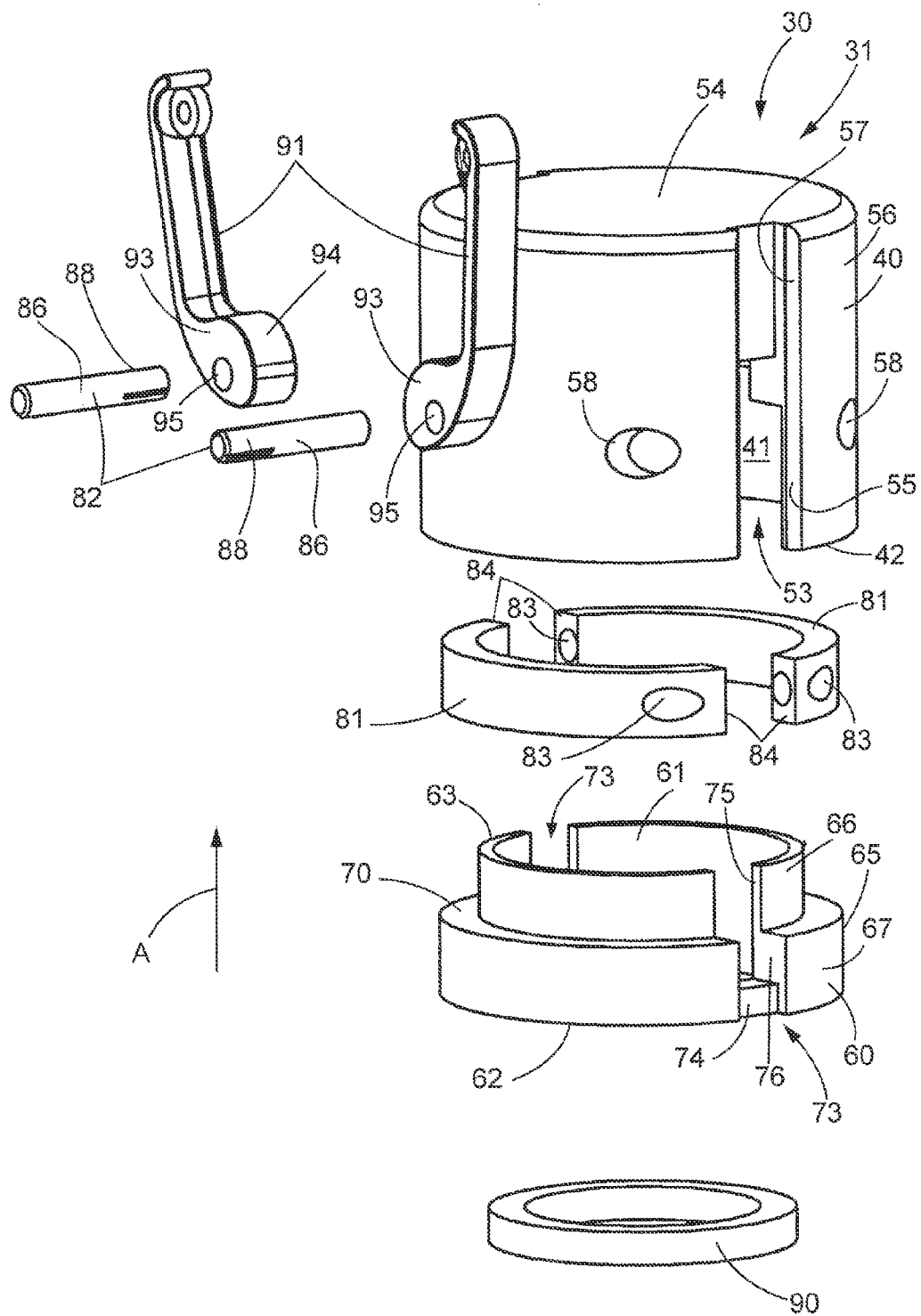
FIG. 3 is an exploded perspective view of the cover of FIG. 2.
Figure 4:
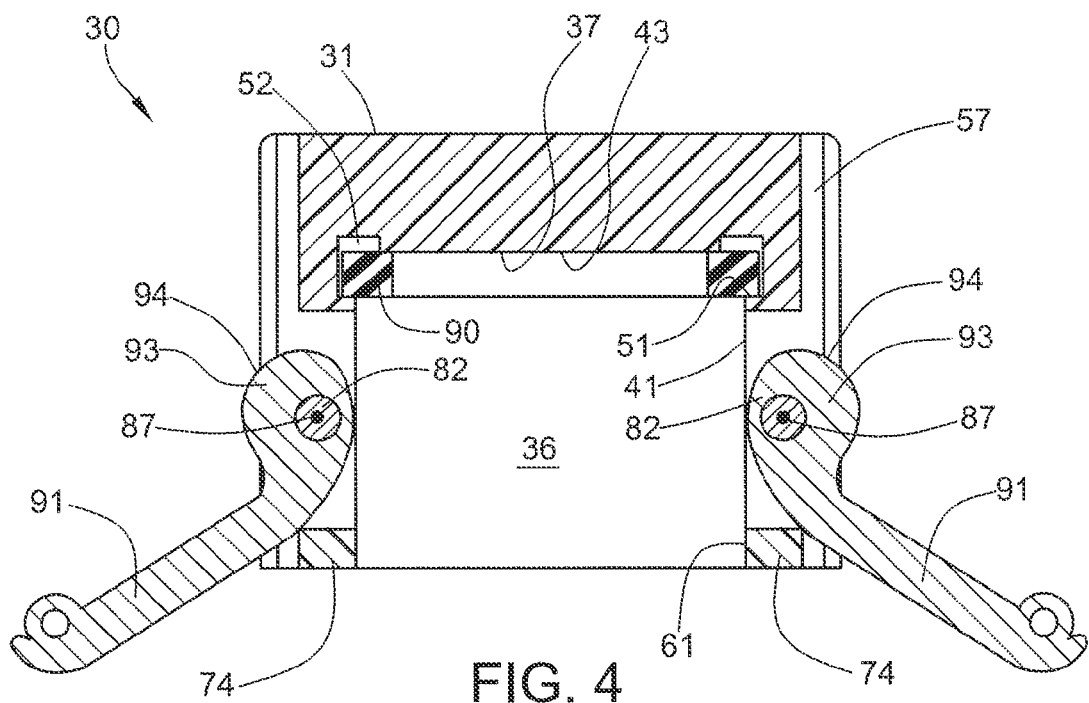
FIG. 4 is a cross-section of the cover taken generally along line 4-4 of FIG. 2 but with the lever arms in their unlocked position.
Figure 5:
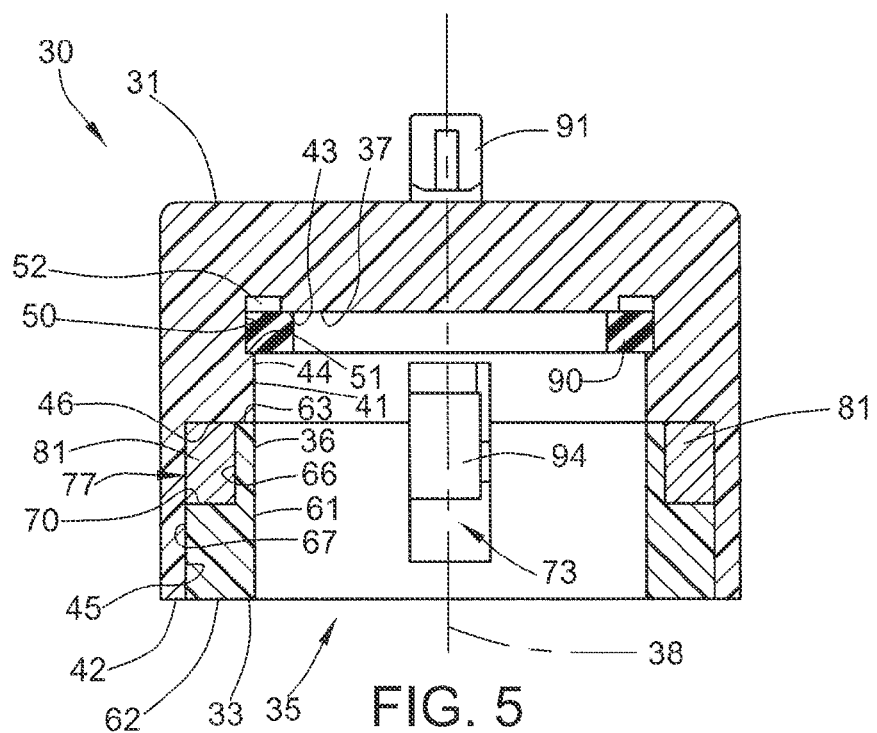
FIG. 5 is a cross-section taken generally along 5-5 of FIG. 2.
Figure 6:
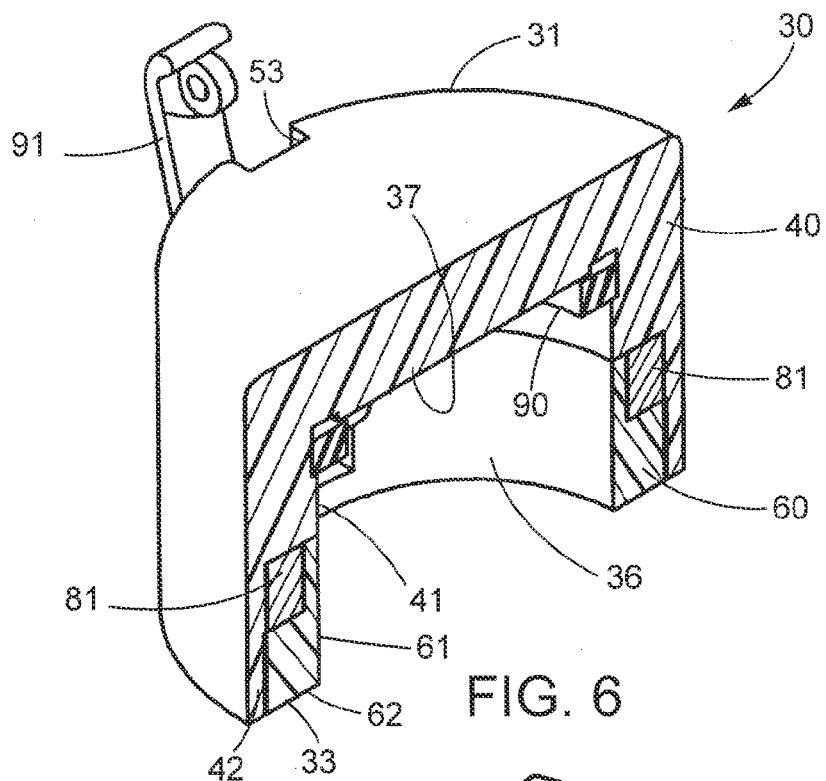
FIG. 6 is a cross-sectional perspective view of the cover corresponding to FIG. 5.

Referring to FIGS. 3 and 5, the components of the cap 30 are illustrated. Body 31 includes an upper or outer body component 40 and a lower or inner body component 60, each made of UHMWPE. Upper body component 40 is generally cylindrical with a stepped or countersunk inner bore 41 that extends between open end surface 42 and closed end surface 43. Open end surface 42 partially defines the open end 33 of body 31. The closed end surface 43 defines the internal end surface 37 of body 31. Stepped inner bore 41 includes a first or upper generally cylindrical inner surface 44 and a second or lower generally cylindrical inner surface 45. Upper inner surface 44 extends from closed end surface 43 towards open end surface 42 to ledge or step surface 46 that is generally parallel to closed end surface 43. The upper inner surface 44 partially defines the inner cylindrical surface 36 of body 31. Lower inner surface 45 extends from step surface 46 to open end surface 42. Step surface 46 is generally perpendicular to upper inner surface 44 and lower inner surface 45.

Upper inner surface 44 of upper body component 40 includes a radially enlarged cylindrical gasket securing recess 50 adjacent closed end surface 43. The gasket securing recess 50 is slightly larger in diameter than the upper inner surface 44 and has an outer diameter dimensioned to receive annular gasket 90 therein. Gasket securing recess 50 has a vertical or axial length generally equal to the thickness of gasket 90. Such a configuration creates a lip 51 that operates to secure the gasket 90 within the bore 41 of upper body 40.

An annular recess 52 may be provided that extends from the gasket securing recess 50 into the closed end surface 43 and away from open end surface 42. As described in further detail below, the annular recess 52 may be included to provide a space or cavity into which the gasket 90 may deflect when the cap 30 is locked on adapter 10.

A pair of diametrically opposed lever arm receiving slots 53 extend vertically from the open end surface 42 to the upper end surface 54 of the upper body component 40. Each slot 53 has a lower section 55 that extends between the outer surface 56 of upper body component 40 and the stepped inner bore 41. Each slot 53 may further have an upper section 57 that extends into the upper body component 40 generally from the gasket securing recess to the upper end surface 54. The slots 53 are dimensioned laterally to permit the lever arms 91 to pivot therein between their locked and unlocked positions. The upper section 57 of each slot may have a depth sufficient to permit lever arms 91 to be recessed within cover 30 when in the locked position.

Two pairs of aligned pin positioning holes or bores 58 extend through the outer surface 56 of upper body component 40 with the bores of each pair being positioned on opposite sides of one of the slots 53. More specifically, the bores 58 of each pair are positioned so that a line or chord extending through the bores generally extends through the lower section 55 of one of the slots 53.

Lower body component 60 is generally cylindrical or tubular with a generally cylindrical inner bore 61 that extends between open end surface 62 and opposite end surface 63. Open end surface 62 partially defines the open end 33 of body 31. As best seen in FIG. 5, open end surface 62 together with open end surface 42 of upper body component 40 define the open end 33 of body 31. The inner bore 61 partially defines the inner cylindrical surface 36 of body 31. Upper inner surface 44 together with inner bore 61 define the inner cylindrical surface 36 of body 31.

Lower body component 60 has a stepped cylindrical outer surface 65 that generally corresponds to and is configured to be received within stepped inner bore 41 of upper body component 40. More specifically, stepped outer surface 65 includes a first or upper generally cylindrical outer surface 66 and a second or lower generally cylindrical outer surface 67. The upper outer surface 66 extends from the end surface 63 towards open end surface 62 and terminates at ledge or step surface 70. Lower outer surface 67 extends between open end surface 62 and step surface 70 and has a larger diameter than upper outer surface 66. Lower outer surface 67 is configured to have approximately the same diameter as lower inner surface 45 of upper body component 40. The distance from the open end surface 62 to the opposite end surface 63 is approximately equal to the distance from the open end surface 42 to the step surface 46 of upper body component 40.

Lower body component 60 further includes a pair of diametrically opposed lever arm receiving slots 73 that extend vertically generally from the open end surface 62 to the opposite end surface 63. A web 74 extends across each slot 73 adjacent the open end surface 62. Each slot 73 has an upper section 75 that extends between the upper outer surface 66 of lower body component 60 and the inner bore 61 and a lower section 76 that extends between the lower outer surface 67 of lower body component 60 and the inner bore 61. The slots 73 are dimensioned laterally to permit the lever arms 91 to pivot therein between their locked and unlocked positions.

When lower body component 60 is positioned within upper body component 40, lower inner surface 45, step surface 46, upper outer surface 66, and step surface 67 define a generally annular reinforcement band receiving cavity 77 centered about a central cover axis 38 extending through the internal cavity 35. In other words, the band receiving cavity 77 is generally coaxial with the outer surface 39 of body 30. The pin positioning bores 58 that extend through the outer surface 56 of upper body component 40 are generally aligned or intersect with cavity 77.

Figure 7:
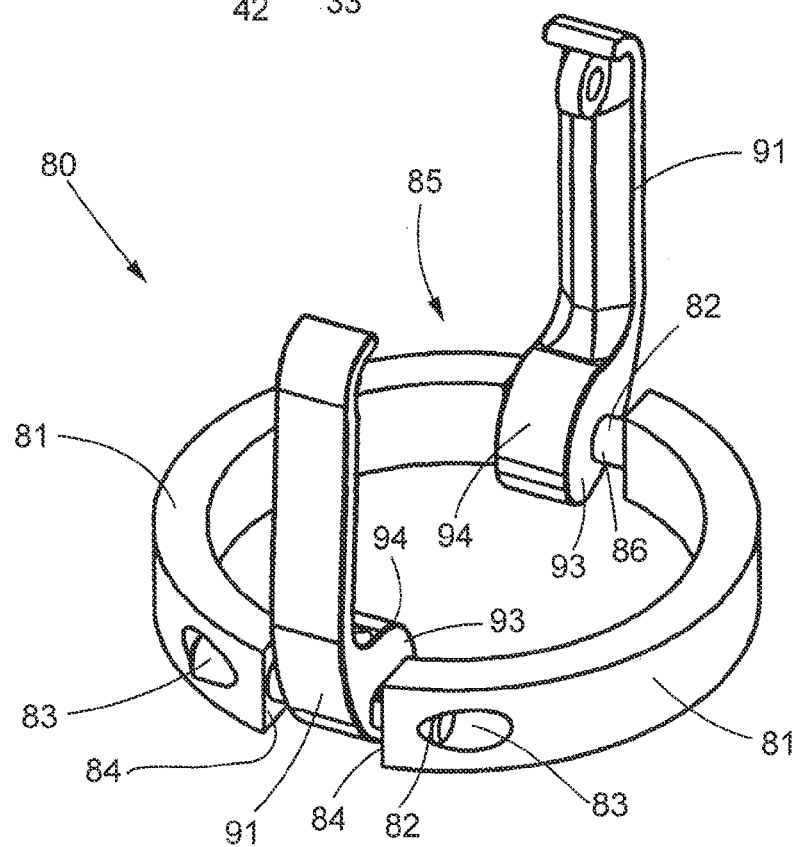
FIG. 7 is a perspective view of the reinforcement and retention system of the cover.

Referring to FIGS. 3 and 7, cap 30 includes a reinforcement and retention system generally designated 80. The reinforcement and retention system 80 is provided to provide additional strength and rigidity to the cap 30 due to the relatively soft nature of UHMWPE. In addition, the reinforcement and retention system 80 provides structure to permit the cap 30 to be removably locked or secured to adapter 10 or another desired component. As depicted, the reinforcement and retention system 80 is made from metal components.

Reinforcement and retention system 80 includes a pair of spaced apart arcuate or curved reinforcement bands or members 81, a pair of cam arm pins 82, and the pair of lever arms 91. The reinforcement bands 81 may be made of any suitable material such as steel and have a generally rectangular cross-section corresponding in size and shape to those of band receiving cavity 77 between upper body component 40 and lower body component 60. It is contemplated that the reinforcement bands 81 may alternatively be formed from other materials. The bands 81 are positioned within band receiving cavity 77 and have a radius of curvature centered about central axis 38. Each reinforcement band 81 includes a pair of pin receiving bores 83 with one being adjacent each end 84 thereof.

A cam arm pin 82 extends between and interconnects one end 84 of each band 81 to an end 84 of the other band. The pins 82 may be secured within bore 83 in any desired manner. In one example, the pins 82 may be press-fit within bores 83. The cam arm pins 83 perform multiple functions. As a first function, the cam arm pins 82 interconnect the reinforcement bands 81 to create a generally circular reinforcing member indicated generally at 85. The reinforcing member 85 encircles or surrounds a portion of the bore. As a second function, a portion of the outer surface 86 of the pins 82 (i.e., that which is not within bores 83) acts as a guide surface or an axle about which the lever arms 91 may pivot between their locked and unlocked position. More specifically, each lever arm 91 has a mounting bore 95 through retention cam 93 into which one of the cam arm pins 82 extends to pivotally mount the lever arm to the reinforcement band 81. Through such a configuration, each lever arm 91 may pivot about axis 87 through one of the cam arm pins 82.

In some instances, the cap 30 may be mounted on an adapter 10 made of UHMWPE. However, in other instances, the cap 30 may be mounted on an adapter 10 made of a material dissimilar to the cap such as metal and thus may have a substantially different coefficient of thermal expansion as compared to the cap. As a result of the relatively large coefficient of thermal expansion of UHMWPE, the distance "D" (FIG. 1) between the internal end surface 37 and the axis 87 of cam arm pin 82 may change relatively significantly between extreme hot and cold operating conditions. More specifically, the distance D will be at a minimum at cold temperatures and at a maximum at hot temperatures.

Desired sealing characteristics may be achieved by using a gasket 90 that is configured to accommodate the relatively large changes in the distance D. However, in some instances, such a gasket may not be available or it may be desirable to use an industry standard gasket 90 used with non-UHMWPE caps. In such case, a thermal expansion compensation structure such as annular recess 52 may be provided to accommodate the relatively large thermal expansion of the cap 30. More specifically, in a typical configuration of cap 30, the dimensions of the cap are set to provide minimum desired sealing characteristics when the cap is at a maximum temperature (i.e., when the distance D is at its maximum). As the temperature decreases, the distance D is reduced and the gasket must be compressed a greater amount to permit lever arms 91 to be closed. When cap 30 is made of UHMWPE and at cold temperatures, the distance D will be substantially reduced. As a result, the gasket 90 will be compressed to a greater extent when locking the lever arms 91. This increased compression will increase the force that must be exerted on lever arm 91 to lock the cap 30 in place.

Annular recess 52 is provided to reduce the amount of surface area of the internal end surface 37 that engages or contacts the gasket 90. This reduced contact area permits greater compression of the gasket 90 for a specific force applied by lever arms 91. In other words, reducing the surface area that contacts the gasket 90 permits the gasket to be compressed farther with less force on the lever arms 91. By adjusting the configuration of the end surface 37 and the dimensions of the cap 30, the spring rate or constant of the gasket is effectively reduced. As such, the gasket 90 may be compressed by a greater amount without requiring excessive forces applied through lever arms 91. This increased compression compensates for the reduction in the distance D due to contraction of the UHMWPE material at cold temperatures.

It should be noted that the exploded view of FIG. 3 depicts and the description above relating to such drawing describes the upper body component 40 and the lower body component 60 as they exist after assembly and subsequent machining. More specifically, the lever arm receiving slots 53 in the upper body component 40 and the lever arm receiving slots 73 in the lower body component 60 are created after the upper body component and the lower body component 60 have been joined together as described in more detail below. As such, the upper body component 40 and the lower body component 60 do not exist in the form depicted in FIG. 3 prior to assembly. Similarly, the reinforcement and retention system 80 does not exist as depicted in FIG. 7 and described above until after assembly of the cover 30.

To assemble cap 30, the pair of reinforcement bands 85 are positioned with upper body component 40 adjacent the lower inner surface 45 and the step surface 46 so that the pin positioning bores 58 of the upper body component are aligned with the pin receiving bores 83 of the reinforcement bands 81. Temporary pins (not shown) or another positioning structure for holding the reinforcement bands 81 in place are inserted through each of the pin positioning bores 58 and into the pin receiving bores 83 of each reinforcement band 81 to temporarily secure the reinforcement bands 81 to the upper body component 40. If desired, the temporary pins or positioning structure may interconnect the adjacent pin receiving bores 83 to also secure the reinforcement bands 81 together.

The lower body component 60 (without lever arm receiving slots 73 formed therein) is then slid into the upper body component 40 as indicated by arrow "A" in FIG. 3. The lower outer surface 67 is positioned adjacent lower inner surface 45, the end surface 63 is positioned adjacent step surface 46, and reinforcement bands 81 are captured within the band receiving cavity 77 formed between the lower inner surface 45, the step surface 46, the upper outer surface 66, and the stepped surface 70.

In one process, the upper body component 40 and the lower body component 60 may be are joined together such as by friction or spin welding. For example, either the upper body component 40 (together with the reinforcement bands 81 and the temporary pins) or the lower body component 60 is secured to a fixed fixture (not shown) and the other of the upper body component 40 and the lower body component 60 is fixed in a rotatable fixture (not shown). The upper body component 40 and the lower body component 60 are positioned adjacent each other and the rotatable fixture is rotated relative to the fixed fixture about the central axis 38 of cover 30 so that the upper body component 40 (together with reinforcement bands 81) and the lower body component 60 are rotated rapidly relative to each other. Axial pressure is applied between the upper body component 40 and the lower body component and heat generated by the rotational friction at the joint line between the upper body component 40 and the lower body component 60 causes melting of the body components at the joint line which results in welding of the body components together.

Through such a spin welding process, the reinforcement bands 81 are secured within the band receiving cavity 77 and, as depicted in FIG. 5, are spaced and isolated from the inner generally cylindrical surface 36 of cavity 35. In addition, because the reinforcement bands 81 are secured to the upper body component 40, the pin receiving bores 83 of each reinforcement band 81 remain aligned with the pin positioning bores 58 in upper housing component 40.

Once the upper and lower body components 40 and 60 are joined together, the joined components may be machined to create lever arm receiving slots 53 in upper body component 40 and lever arm receiving slots 73 in lower body component 60 between the pin positioning bore 58. If desired, additional machining may also be performed to achieve desired tolerances of the cover 30.

The temporary pins (not shown) may be removed from the pin receiving bores 83 of each reinforcement band 81 either before or after the lever arm receiving slots 53 and 73 are machined, as desired. A lever arm 91 is positioned within each lever arm receiving slot 53 in upper body component 40 and the lever arm receiving slot 73 in lower body component 60. In doing so, the mounting bore 95 of each lever arm 91 is aligned with the pin positioning bore 58 of upper housing component 40. A cam arm pin 82 is slid through one of the bores 58 in the upper body component 40, through one of the pin receiving bores 83 in one of the reinforcement bands 81, through the mounting bore 95 in the aligned lever arm 91, and into the aligned pin receiving bore 83 in the second of the reinforcement bands. Insertion of the cam arm pins 82 through the mounting bore 95 and into the pin receiving bores 83 in the reinforcement bands 81 completes the assembly of the reinforcement and retention system 80.

The cam arm pin 82, the pin receiving bores 83, and the mounting bore 95 may be dimensioned so that a first end 88 of the cam arm pin 82 passes through the pin receiving bore 83 in a first of the reinforcement bands 81, through the mounting bore 95 in retention cam 93, and into the pin receiving bore 83 in the second of the reinforcement bands. The cam arm pin 82 and the pin receiving bores 83 may be dimensioned so as to create an interference fit at either or both of the pin receiving bores. Other manners of securing the cam arm pins to the reinforcement bands 81 are contemplated.

It should be appreciated that the configuration of the depicted cover 30 and the components thereof is merely illustrative. The cover 30 and its components may take any suitable form. For example, the joint between the upper and lower body components 40 and 60 may take any of a plurality of forms that are rotationally symmetrical. In addition, while upper and lower body components 40 and 60 are depicted as being formed from UHMWPE, such components may be formed from other materials having similar properties and/or characteristics. Further, while the body 31 is depicted as being formed of upper body component 40 and lower body component 60 that are spin welded together, other manners of forming body 31 are contemplated. For example, body 31 may be formed by a process such as sintering or another process manner of shaping or joining UHMWPE. Still further, while the cover 30 is depicted with lever arms 91, cover 30 may also be formed without such lever arms. In such case, the reinforcement bands 81 may be formed as a one-piece member. In other instances, the reinforcement bands 81 may be formed as a one-piece member and the lever arms 91 mounted in a different manner. By spacing and isolating the reinforcement bands 81 from the internal or inner cylindrical surface 36 of cavity 35, the reinforcement bands are isolated from corrosive chemicals and other materials that may pass through the adapter 10.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A closure for sealing an end of a tube, comprising:
   a polymeric body having a cavity, the cavity having an open end and a closed end, the closed end having an internal sealing surface, the cavity being configured to slidably receive the end of the tube;
   a reinforcement member spaced from and generally surrounding at least a portion of the cavity; and
   a sealing member generally adjacent the internal sealing surface of the closed end, the sealing member configured to interact with the internal sealing surface and the end of the tube to seal the tube,
   and said closure further including a pair of locking arms mounted on the reinforcement member.

2. The closure of claim 1, wherein the reinforcement member is at least partially embedded in the body.

3. The closure of claim 1, wherein the reinforcement member is made of metal.

4. The closure of claim 1, wherein the cavity is a cylindrical bore and the reinforcement member includes a generally annular member.

5. The closure of claim 4, wherein the generally annular member is formed with a pair of aligned arcuate bands.

6. The closure of claim 5, wherein the pair of arcuate bands are interconnected by a pair of pins, and each said locking arm is pivotally mounted on one of the pins.

7. The closure of claim 6, wherein the locking arms are diametrically opposed relative to the bore of the body.

8. The closure of claim 1, wherein the body includes a first body component and a second body component secured together with the reinforcement member captured at least in part between the first body component and the second body component.

9. The closure of claim 8, wherein the first body component and the second body component are friction welded together to form the body.

10. The closure of claim 1, wherein the locking arms are diametrically opposed relative to the cavity of the body.

11. The closure of claim 3, wherein the polymeric body is formed of ultra high molecular weight polyethylene.

12. A closure for sealing an end of a tube, comprising:
    a polymeric body having a cavity, the cavity having an open end and a closed end, the closed end having an internal sealing surface, the cavity being configured to slidably receive the end of the tube;
    a reinforcement member spaced from and generally surrounding at least a portion of the cavity; and
    a sealing member generally adjacent the internal sealing surface of the closed end, the sealing member configured to interact with the internal sealing surface and the end of the tube to seal the tube, said closure further including a thermal expansion compensation structure adjacent the internal sealing surface.

13. The closure of claim 12, wherein the thermal expansion compensation structure is an annular recess in the closed end of the bore.

14. A method of forming a closure for sealing to an end of a tube, said closure
    a polymeric body having a cavity, the cavity having an open end and a closed end, the closed end having an internal sealing surface, the cavity being configured to slidably receive the end of the tube;
    a reinforcement member spaced from and generally surrounding at least a portion of the cavity; and
    a sealing member generally adjacent the internal sealing surface of the closed end, the sealing member configured to interact with the internal sealing surface and the end of the tube to seal the tube, and
    said closure further including a pair of locking arms mounted on the reinforcement member,
said method comprising:
    providing a first polymeric body component;
    providing a second polymeric body component;
    positioning a reinforcement member adjacent one of the first body component and the second body component;
    securing the first body component to the second body component to form a body and capture the reinforcement member at least partially between the first body component and the second body component and
    mounting a sealing member generally adjacent the internal sealing surface.

15. The method of claim 14, further including rotating the first body component relative to the second body component to secure the first body component to the second body component.

16. The method of claim 15, wherein rotating the first body component relative to the second body component includes spin welding the first body component to the second body component.

17. The method of claim 14, further including mounting said locking structure on the reinforcement member.

18. A connection assembly for sealing to an end of a tube, comprising:
    a polymeric body having a cavity, the cavity having an open end and an internal sealing surface spaced from the open end, the cavity being configured to slidably receive the end of the tube;
    a reinforcement member spaced from and generally surrounding at least a portion of the cavity; and a sealing member adjacent the internal sealing surface of the cavity, the sealing member configured to interact with the internal sealing surface of the cavity and the end of the tube to form a seal between the connection assembly and the tube, and said closure further including a pair of locking arms mounted on the reinforcement member.

19. The connection assembly of claim 18, wherein the polymeric body is formed of ultra high molecular weight polyethylene.

20. The connection assembly of claim 19 wherein said closure further includes a thermal expansion compensation structure adjacent said sealing surface.

\* \* \* \* \*